United States Patent [19]
Peasley

[11] 4,036,754
[45] July 19, 1977

[54] SEWAGE TREATMENT APPARATUS

[76] Inventor: Howard P. Peasley, 7923 Chowning Road, Richmond, Va. 23229

[21] Appl. No.: 711,762

[22] Filed: Aug. 4, 1976

[51] Int. Cl.² .......................... C02C 1/12; B01D 23/24
[52] U.S. Cl. .................................... 210/139; 210/151; 210/196; 210/220; 210/256; 210/265; 210/275
[58] Field of Search ................. 210/138, 194, 195 SO, 210/196, 220, 221 R, 265, 274, 275, 291, 305, 311, 320, 20, 150, 151, 139, 256

[56] References Cited

U.S. PATENT DOCUMENTS

| | | | |
|---|---|---|---|
| 2,355,564 | 8/1944 | Sebald | 210/20 |
| 2,574,685 | 11/1951 | Baxter et al. | 210/195 SO |
| 3,126,333 | 3/1964 | Williams | 210/274 X |
| 3,286,842 | 11/1966 | De Jong | 210/275 |
| 3,313,725 | 4/1967 | Tsuda et al. | 210/20 |
| 3,481,868 | 12/1969 | Gilwood et al. | 210/20 X |
| 3,792,773 | 2/1974 | Ross | 210/275 |
| 3,820,658 | 6/1974 | Cruze, Jr. | 210/275 X |
| 3,951,788 | 4/1976 | Ward et al. | 210/220 X |
| 3,984,322 | 10/1976 | Peasley et al. | 210/220 X |

Primary Examiner—Thomas G. Wyse
Assistant Examiner—Robert H. Spitzer
Attorney, Agent, or Firm—Dowell & Dowell

[57] ABSTRACT

An aerobic bacteria sewage treatment apparatus for treating waste water mixed with activated sludge by circulating the mixed liquor about a clarification compartment placed in a main treatment tank from which the clarification compartment withdraws water at a quiescent zone and further separates out and filters solid matter, finally delivering a well clarified effluent withdrawn from the top of the clarification compartment, the apparatus having an auxiliary digester compartment operative to periodically receive a proportion of the contents of the main tank, which contents are treated and allowed a time to settle out solids, whereupon the clear water from the auxiliary compartment is returned to the main treatment tank and the solids are left to accumulate for further treatment and later removal, the transfer of said proportion of the mixed liquor from the main tank being accomplished by overflow resulting from a purge cycle during which the clarification compartment is back-flushed into the main treatment tank.

12 Claims, 8 Drawing Figures

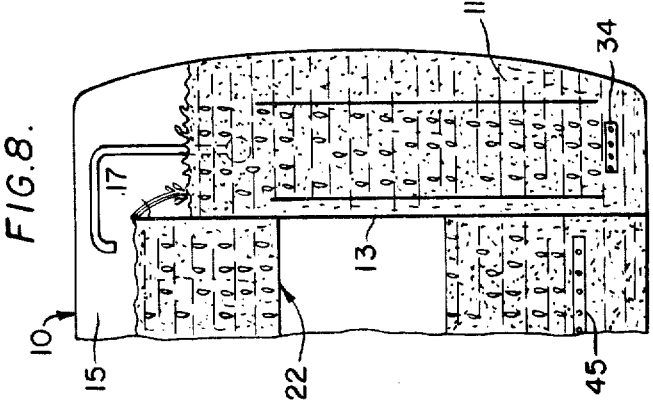
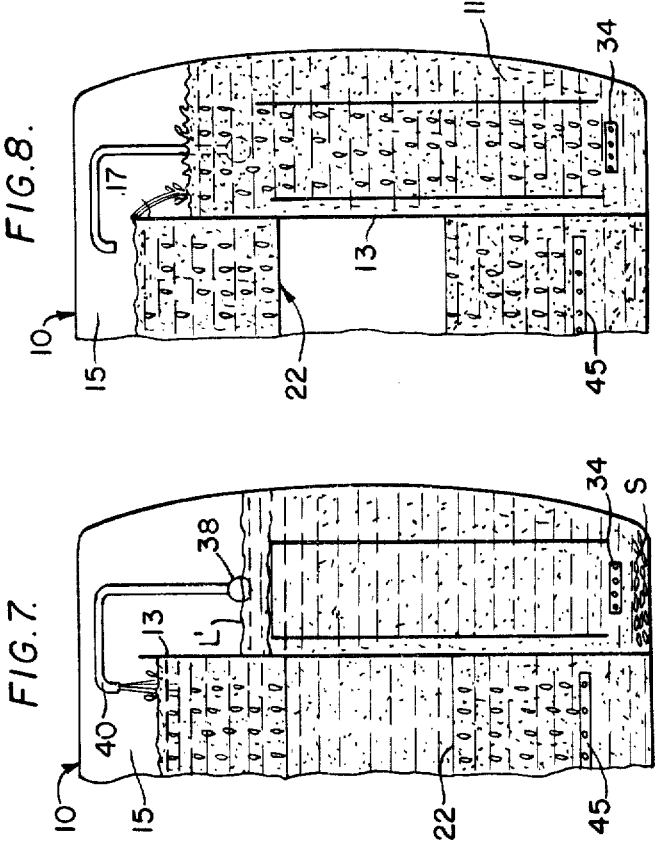
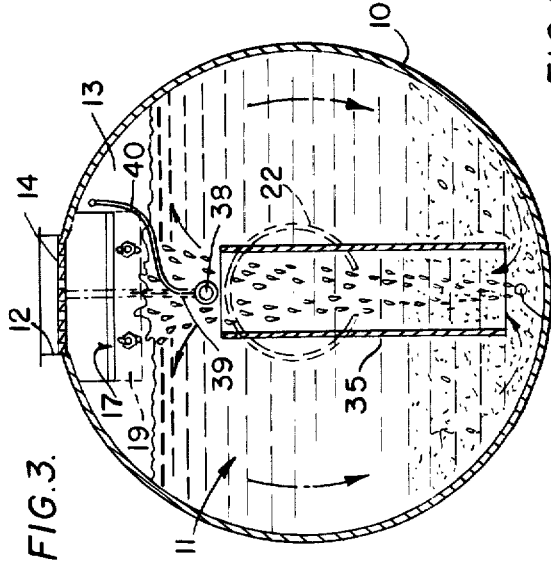
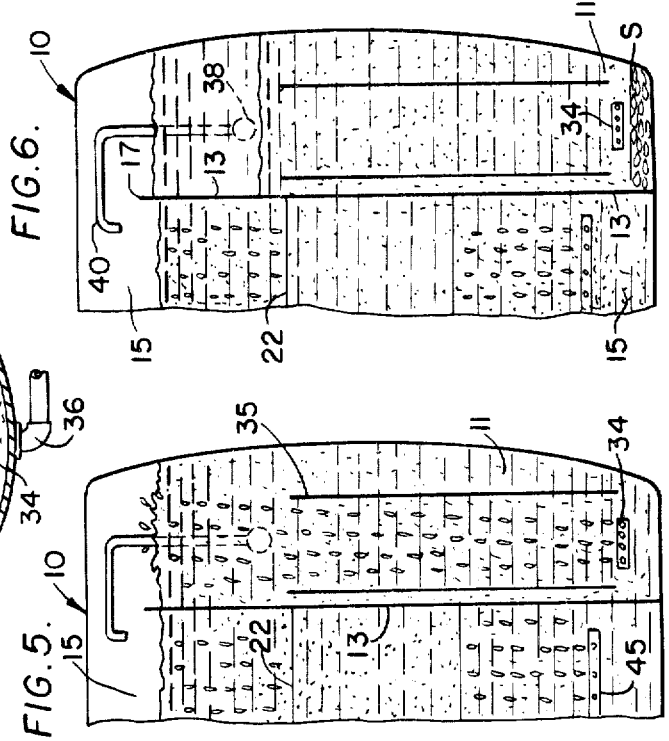

SEWAGE TREATMENT APPARATUS

FIELD OF INVENTION

This invention relates to apparatus for treating waste waters of the type employing aerobic bacteria to digest biodegradable matter, and employing improved apparatus for circulating and aerating the activated sludge and improved apparatus for removing solids from the main treatment tank to prevent excessive build-up of such solids therein during normal use.

BACKGROUND AND PRIOR ART

The principles on which the present apparatus is based are well known in the prior art. For instance, the concept of making a treatment plant using aeration to sustain the bacterial digestion of wastes for small communities has been extensively discussed in a 1966 publication of the National Sanitation Foundation of Ann Arbor, Mich., entitled "Package Plant Criteria Development" based on a study made for the Federal Water Pollution Control Administration, Demonstration Grant Project WPD-74. Moreover, the concept of bubbling air through the sewage in a manner to make it circulate is known in the prior art as evidenced by U.S. Pat. Nos. 3,348,687 to Foster; 3,627,136 to Mackrle and 3,809,245 to Kennedy, these patents using such circulation to promote centrifugal separation of solid particles from the sewage so that relatively clearer water can be removed as an effluent. The copending patent application of Peasley and McKinney, Ser. No. 579,176 filed May 20, 1975, now U.S. Pat. No. 3,984,322, and entitled "Sewage Treatment Apparatus" shows an aerobic bacteria sewage treatment apparatus using compressed air to aerate waste water mixed with activated sludge, and to cause it to circulate about a cylindrical clarification compartment placed in a tank and having means to provide a zone of relative quiescence in the circulating sewage from which the clarification compartment withdraws water and further separates solid matter therefrom, finally delivering a well clarified effluent, the effluent being withdrawn from the top of the clarification compartment above a filter bed whereby the effluent is substantially free of solid matter. The copending patent application of Howard Peasley, Ser. No. 641,867 filed Dec. 17, 1975 and entitled "Apparatus for Treating Sewage" adds, among other features, the concept of periodically using the compressed air source to backflush the clarification compartment and filter means therein, to purge the latter and increase the operating efficiency of the apparatus, doing so at a time when the apparatus is experiencing minimum influx of new sewage for treatment.

THE INVENTION

The present invention provides an improved sewage treatment apparatus in which the main disposal of sludge is achieved by bacterial digestion, rather than by mere separation, and in which the mechanical circulation of sewage in the main bacterial treatment tank is performed for the purpose of keeping the solid materials from settling while the digestion is in progress and for the purpose of faciitating the drawing off of clarified effluent from the main circulating stream without recontamination of the effluent by newly arriving solids which are as yet substantially untreated. However, despite the bacterial digestion, there is stil a constant build-up of solid materials, i.e., indigestable ash that must be removed. The present invention adds an additional compartment and cooperating structures which are tied to the periodic purge cycle, and which operate in such a manner as to remove solids from the main treatment tank in proportion to the concentration of such solids in the tank and therefore in proportion to the need for their removal.

OBJECTS OF THE INVENTION

It is a principal object of this invention to provide an improved sewage treatment apparatus suitable for use in small communities, in private dwellings, and in isolated buildings, and especially to provide a self-contained system having particular utility in areas having a high water table and/or a tendency toward periodic flooding, such as in tidewater areas, the system being easily sealable in case of flooding to prevent overflow of its contents and resulting contamination.

It is another major object of the invention to provide an improved system for removing a percentage of the solid matter from a main treatment tank having a clarification compartment located in a vortex of circulating sewage, the compartment normally operating to withdraw clarified water from this point of minimum turbulence in the circulating sewage, but being periodically backflushed with compressed air to purge the filter means in the clarification compartment. This backflushing drives the water from the clarification compartment back into the main treatment tank, thereby raising the level of liquid in the main tank and causing part of its contents to overflow into an auxiliary digester compartment where the aerobic digestion continues, but where during a periodically recurring cycle, the solids are allowed to settle out and collect near a draw-off pipe. The resulting supernatant liquid is returned to the main treatment tank.

Still another object of the invention is to provide apparatus in which the auxiliary digester compartment is separated from the main treatment tank by a baffle having a weir at its upper and located above the normal level of the liquid in the main tank. Normal surges during use will not cause overflow of the main tank into the digester compartment, but such overflow does occur during the purge cycle when the clarification compartment is back-flushed with compressed air and thereby emptied. The apparatus includes a cylindrical main treatment tank having a substantially cylindrical clarification compartment which extends the length of the tank and is located in the vortex of circulation in the main tank. The circulation about the compartment being sustained by aerating means which bubbles air upwardly offset to one side of the circulating tank, thereby creating a rotation of the sewage about the compartment within the tank together with aeration sufficient to support the bacteria. This circulation about the horizontal axis of the main tank is effective to maintain substantially all solids in circulating suspension. The aeration and circulation in the main tank is continuous. Therefore, when the purging of the clarification compartment occurs, at regular intervals, the resulting overflow at the weir takes with it a percentage of the liquid in the main tank, and therefore a similar percentage of the total solids in suspension therein. Thus, if the solids content is low, a relatively smaller quantity of solids will be removed from the main tank than will be the case where the solids content in circulation is high, whereby the removal of solids is proportional to the need for such removal. The removed solids are not returned to the main tank, but are periodically removed as a maintenance step by pumping them out through the draw-off pipe.

It is the object of the invention to provide apparatus by which the amount of ash in the main tank will be controlled in such a way as to strike an equilibrium level which is satisfactory, and which will then have a strong tendency to maintain that equilibrium in spite of fluctuation in the solids input. An important feature of this auxiliary digester compartment is that is uses the purge cycle which is described in the above mentioned Ser. No. 641,867 to achieve periodic input to the digester compartment over said weir, which is located somewhat above liquid level in the main circulation tank. The weir is adjustable to a selected level somewhat above the level of the effluent pipe. When the clarification chamber is back-flushed or purged, which is accomplished periodically, i.e., once every 24 hours, all of the water in the clarification chamber is forced out through the bottom thereof by compressed air introduced in the top of the clarification compartment. As a result, the liquid in the main tank rises rather substantially depending on the volume of liquid in the clarification chamber. Before the chamber is empty, it will have raised the level in the main tank to the overflow point of the weir and beyond, so that a predetermined volume of the mixed liquor in the main tank will have flowed over the weir and into the digester compartment. This is a major distinguishing feature of the invention, namely, that unlike many prior art systems which draw-off solids from the main treatment tank at a point of quiescent concentration of these solids, in the present system the liquid which is transferred into the axiliary digester compartment from the main tank is the mixed liquor which is being continuously circulated in the main tank and always at a rate sufficient to keep virtually all of the solids in suspension. The advantage of transferring mixed liquor instead of transferring concentrated solids from some point of natural accumulation, is that according to the present arrangement, the amount of solids transferred into the auxiliary chamber varies with the total amount of solids in suspension, and therefore with the need for such transfer. If the apparatus always took the solids to be transferred from a point of solids concentration in the main tank, then the effect would be that the system would always be transferring substantially a constant amount of solids each time, that is, at each purge cycle, regardless of whether the need for such transfer is great or small. Therefore, in the present apparatus there is a correlation between the need for removal and the quantity that is removed, and by careful adjustment of the various proportions and parameters, it is possible to achieve an equilibrium point which is in a desirable range.

It is a further object of the invention to provide a digester compartment which continues to digest the mixed liquor, which was introduced into the compartment at the time of the last purge, by continuously circulating and aerating the liquor by the introduction of air at the bottom using a diffuser. This air rises through a vertical draft tube which is extended to a point near the bottom of the digester compartment, and thus tends to suck solids off of the bottom of the tank and keep them circulating upwardly in the middle of the compartment and downwardly around its sides. When the built-in timer is approaching a purge cycle, say for the last 2 hours before purge, the air to the diffuser which is located in the auxiliary digester compartment is shutoff and the solids tend to settle out, leaving a supernatant liquid which is essentially clear located in the upper portion of the digester compartment. After several hours of settling, a pump for the supernatant is started, and it pumps off the top compartment, returning the clear supernatant liquid back over the weir into the main tank, thereby lowering the level of liquid in the auxiliary compartment until it is reduced to the level at which the supernatant pump intake is located. Below the level of the supernatant liquid there will be a level of settled solids to which, when the aerator is shut-off, the solids settle in the digester compartment. Over a period of months the level of this sediment grows in the bottom of the auxiliary compartment, and when the compartment gets so full of solids that they begin to be drawn into the supernatant pump and pumped into the main treatment tank, then it is necessary to couple a pump to the draw-off tube and pump out the solids to get their level back down again.

Other objects and advantages of the invention will become apparent during the following discussion of the drawings, wherein:

THE DRAWINGS

FIG. 3 is a sectional view of the apparatus taken along line 3—3 in FIG. 1;

FIG. 4 is a table showing a typical timed cycle for alternately achieving normal operation interspersed with purging of the apparatus as shown in FIGS. 1, 2 and 3; and FIGS. 5, 6, 7, and 8 are partial schematic views of the apparatus illustrating its operation during the four different time intervals which are set forth in the table shown in FIG. 4.

Figure 1:
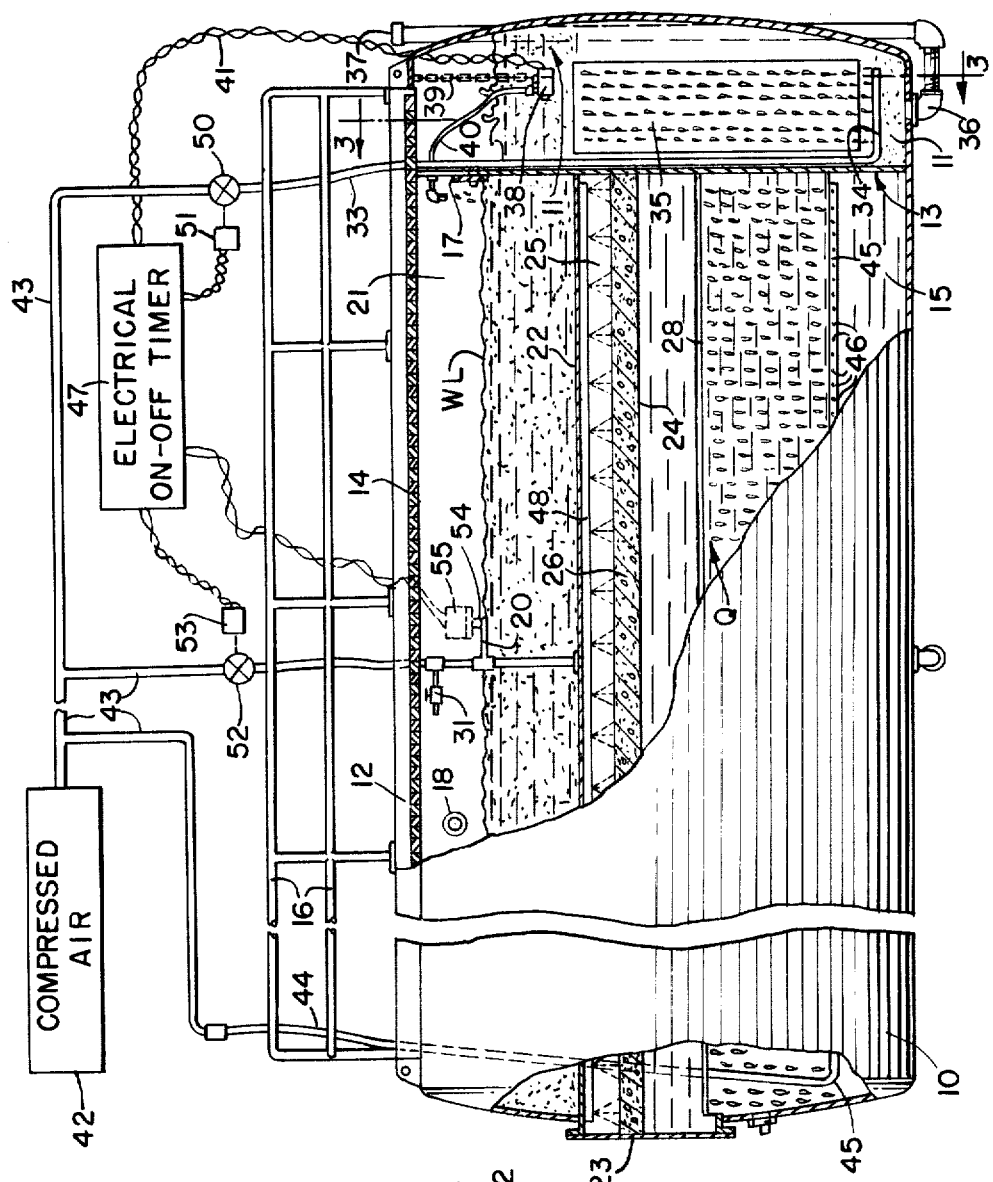
FIG. 1 is an elevation view partly in section showing sewage treatment apparatus according to the present invention and showing associated timer and control means.

Referring now to the drawings, FIG. 1 shows a sewage treatment tank 10 which is essentially cylindrical, although not necessarily exactly circular in cross-section, the tank having a flanged opening 12 at its upper end, the opening normally being covered by suitable means, such as a removable manhole cover (not shown), or by a grating 14 with a railing 16 around it. The grating has openings through it to permit the escape of air and gases in order to maintain the liquid in the tank at atmospheric pressure. The tank has a sewage inlet 18 which enters near the left end of the tank 10 and away from the auxiliary digester compartment 11 which is to the right of the partition 13, as seen in FIGS. 1 and 3. The inlet pipe 18 is connected to the raw sewage system (not shown) of a small community, rural school, or dwelling. Clarified water is discharged from the system through the outlet pipe 20 which extends through one side of the tank, the level of the pipe 20 being selected so that the minimal level WL to which the liquid in the tank can drain is the level of the water pipe 20, FIG. 2, although the water level WL can build up higher within the surge zone 21 at the top of the tank during periods of peak use of the sewage system, as will hereinafter be explained more fully.

Within the tank 10 there is located a clarification compartment 22 comprising an essentially cylindrical housing extending the full length of the tank 10 and sealed at its ends, preferably in an opening through the left end wall of the tank using an elastomeric gasket and circular end plate 23. The right end of the compartment 22 is sealed against the partition 13 dividing the main circulation tank 15 from an auxiliary digester compartment 11. The compartment 22 is about 10% of the main tank 10 by volume, i.e., large enough so that the velocity of the waste waters passing through the compartment 22 will remain below recognized settling rates. The clarification compartment 22 is circular on its outer surface so as to provide minimal eddy currents in the liquid as it circulates around the compartment in the tank. Inside of the clarification compartment 22 there is a perforated tray 24 which serves to support a filter, for instance, such as a bed of aggregate 26, the tray being located somewhat above the center of the compartment 22 and well above the slot 28 which extends full length through the bottom of the compartment. The aggregate bed 26 occupies some of the space above the center of the compartment 22 but leaves a zone 25 above the bed from which clarified water is withdrawn.

Figure 2:
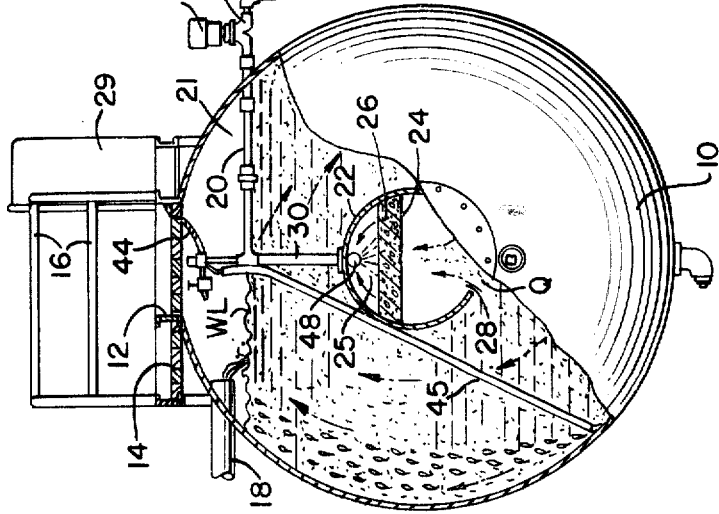
FIG. 2 is an end view of the apparatus partly in cross-section.

As can be seen in FIGS. 1 and 2, a stand pipe 30 extends above the top zone 25 of the clarification compartment 22 to a level somewhat below the top of the tank 10. The stand pipe 30 is vented at its top by a manually adjustable valve 31 and is joined by the horizontal effluent pipe 20, which draws off clarified water from within the clarification compartment 22 and delivers it to a drain 32 as will be further discussed below. The valve 31 is opened just enough to prevent siphoning of the system through the effluent pipe 20 and drain pipe 32, which would in the absence of the vent 31 reduce the water level in the tank 10 below the level of the desired minimum water line WL.

The right-hand end of the main circulating aeration tank 15 is virtually closed by a partition 13 which, as can be seen best in FIG. 3 has a notched-out end providing a weir 17 over which the mixed liquor from the main aeration tank 15 can overflow into the auxiliary digester chamber 11 during the purge cycle as shown schematically in FIG. 8. The height of the weir 17 is made adjustable by a plate 19 having slots therethrough so that it can be bolted in adjusted height position to the partition 13 as shown in FIGS. 1 and 3, whereby the percentage of the total circulating solids which will be transferred by overflow from the main tank 15 into the auxiliary digester chamber 11 during each purge cycle can be selectively adjusted. The auxiliary digester compartment 11 has a compressed air line 33 extending downwardly into it, the line terminating in an air diffuser tube 34 which causes air to bubble upwardly through the contents of the digester compartment 11 to aerate its contents and to cause circulation of the liquid in the compartment 11 as shown by the arrows in FIG. 3. The compartment 11 has a draft tube 35 fixed in position above the diffuser tube 34 so that the circulation of the liquid and air bubbles is upward within the draft tube 35 and downward outside of it. In the bottom of the auxiliary digester chamber 11 there is a drawoff tube 36 which extends up to the top of the tank 10, outside of it, and is normally closed by a removable cap 37. A supernatant pump 38 is suspended on an adjustable height chain 39, the output of the pump extending by a flexible tube 40 through the partition 13 so that when the electrical wires 41 of the pump are energized, the pump 38 will draw liquid from the digester chamber 11 and discharge it through the tube 40 back into the main circulation tank 15 as shown schematically in FIG. 7, thereby drawing the level L' of the liquid in the chamber 11 back down to the level at which the pump 38 is suspended by the chain 39.

A compressed air source 42, such as an air pump, delivers compressed air through pipes 43 to a flexible line 44 which is inserted by pushing it downwardly inside a fixed rigid pipe 45, this pipe extending horizontally the full length of the main tank 15 and being provided with a series of holes 46 located through the horizontal top portion of the pipe. Compressed air from the air source passes through the tubing 44, exits through the holes 46 which are located only in the horizontal portion of the pipe 45, and bubbles upwardly through the liquid in the tank as shown in FIGS. 1, 2, 5, 6, 7 and 8. This bubbling technique is of course an expedient which has per se been used extensively in the prior art. In the present aerobic sewage treatment system the air bubbles serve two purposes: first, the biological purpose of supplying oxygen for sustaining the bacteria in the tank; and second, the mechanical purpose of causing the contents of the tank to mix and circulate in the direction of the arrows shown in FIG. 2, indicating clockwise circulation, the direction being arbitrarily selected.

It should be noted that the clarification compartment 22 is located at about the center of circulation in the tank 10, and is made essentially circular in cross-section so as to minimize turbulence in the vicinity of the vortex of the sewage circulation. The normal functioning of this clarification compartment and its filter means, and the manner in which purging can be accomplished is described in detail in my aforementioned copending Ser. No. 641,867. As is well known in the art, an aggregate filter such as the filter 26 must be back-flushed periodically to restore full flow therethrough. Otherwise it becomes clogged, whereupon it develops a few high-velocity channels through it and becomes virtually useless to achieve filtering. Back-flushing is therefore provided to purge the filter bed 26 to dislodge solid materials. The upper portion of FIG. 1 shows such a system, employing three solenoid operated valves 50, 52 and 54, and also the supernatant pump 38. Between purging cycles the valve 50 is normally open to couple compressed air to the diffuser pipe 34 to aerate and circulate the liquor in the auxiliary chamber 11, but this valve can be selectively closed when its solenoid 51 is energized by a timer 47, FIGS. 6 and 7. Valve 54 is also open normally and connects the effluent pipe 20 with the drain pipe 32. However, when the solenoid 55 is energized during purging, FIG. 8, the valve 54 is closed to block the drain 32. Conversely, the valve 52 is normally closed, but during purging when its solenoid 53 is energized, FIG. 8, the valve 52 opens and connects the source of compressed air 42 to backflush the pipe 20 and to spray the content thereof downwardly through nozzles in the horizontal distribution pipe 48 onto the top of the filter bed 26, thereby to flush the entire contents of the clarification compartment 22 back through the filter bed aggregate 26 and out through the slot 28 in the bottom of the compartment 11. This purging action takes place so long as the electric timer is energizing all three solenoids 51, 53 and 55 simultaneously. See the last line across the chart in FIG. 4. The timer is set to perform such a purge at periodic intervals, i.e., once a day, or as needed. Leakage of compressed air through the vent 31 at the top of the stand pipe 30 is small as compared with the volume of compressed air forced into the stand pipe 30, so that the vent does not defeat the back-flushing action of the air introduced into the stand pipe 30 through the valve 52. When the solenoid 53 is de-energized again to close the valve 52, the back-flushing action ceases. The clarification compartment then refills with water as the air is vented therefrom through the slot 28 and the filter. The vent 31 is small and limits the rate of refilling of the compartment to a gradual flow. The solenoids 51 and 55 return their valves 50 and 54 again to open condition after the timer de-energizes the solenoid 53, thereby terminating the purge cycle. The compressed air is continuously bubbled upwardly from the pipe 45 in the main circulation tank at all times.

OPERATION

The present sewage treatment apparatus operates on a well known principle based on the use of aerobic bacteria in the tank, which bacteria lives on the sewage in the water within the tank and is further sustained by oxygen furnished by the compressed air source 42. The bacteria digests and eliminates virtually all of the sewage, leaving only a relatively small quantity of sediment ash S comprising matter which cannot be digested by the bacteria. This sediment S is being periodically removed from the main tank 15 by transferring some of it over the weir 17 into auxiliary chamber 11, from which it is occasionally removed by attaching a pump to the upper end of the draw-off pipe 36 and pumping out the bottom of the chamber 11.

The tank 15 usually remains filled with liquid to the level of the water line WL at all times, FIG. 5, although this level can increase during intervals of peak use of the sewage system, for example, during recess periods at a school, such increased use of the facilities raising the liquid level higher into the upper surge zone 21 of the main tank 15. The rate of discharge of clear water from the effluent pipe 20 varies only slightly at elevated liquid levels, the diameters of the pipes 20, 30, and 32 having been selected to limit the rate of flow of effluent in such a manner as to keep the velocity of the liquid through the system below recognized settling rates before the clarified water is discharged. During this time the compressed air source 42 drives air through the plastic pipe 44 and through the holes 46 and discharges the air upwardly from the diffuser pipe 45 as illustrated in FIGS. 1 and 2. This upward discharge causes the liquid within the main tank 15 to circulate, and circulates continuously since the air to line 44 is never turned off. However, the rate of circulation is slow enough that the eddy current velocities in the quiescent zone Q are kept below recognized settling rates for the types of sludge expected to be encountered. The quiescent zone Q is located in the vicinity of the slot 28 and just below it. As a result, heavy sludge tends to settle down into the main circulating path below the quiescent zone Q. The clarified water above the filter bed 26 collects in the vicinity of the horizontal pipe 48 which joins the stand pipe 30 at the top of the clarification compartment 22. In the filter bed 26 of the clarification compartment, the bacteria slime on the aggregate continues to digest solid particles. Any accumulation is either back-flushed downwardly from the bed and out of the clarification compartment at the slot 28, or else becomes completely digested by the bacteria. The particles which are back-flushed settle back downwardly through the clarification compartment slot 28, through the quiescent zone Q, and back into the main circulating path of the liquid in the tank 15. Any air or gas in the clarification compartment 22 is of course vented through the vent 31.

FIG. 5 shows the "normal" condition of operation of the apparatus taking place during most of the time cycle shown in the table of FIG. 4, first line. Air is continuously applied to the aeration pipe 45 in the main tank 15, and clarified water is collected in the clarification compartment 22 and drawn off through the effluent pipe 30, 20 and 32, FIGS. 1 and 2. Air is also applied during this "normal" operation to the diffuser pipe 34 which causes aeration of the materials in the auxiliary chamber 11, resulting in their circulation upwardly through the draft tube 35. The draft tube is so placed as to pick up the solids, ash and sludge, in the compartment and keep them circulating while the air is applied to the diffuser 34 through the valve 50. The table of FIG. 4 may represent either a 24 hour period, or it may represent a cycle which takes place less often, i.e., once a week or once a month, etc., as required.

Several hours before purge, FIG. 4, line 2, the air to the auxiliary digester chamber 11 is shut off by the timer 47 closing the valve 50. As a result, circulation ceases in the digester chamber 11 and the solids settle out toward the bottom of the chamber 11, and below the level of the pump 38, FIG. 6.

A short time before purge, FIG. 4, line 3, with the air valve 50 still closed, the supernatant pump 38 is started by the timer 47 and it pumps the supernatant liquid down to the level L', FIG. 7, i.e., pumping the clear liquid back into the main tank 15 to make room in the chamber 11 for a new overflow of mixed liquor during the subsequent purge cycle as shown in FIG. 8 and as set forth in line 4 of the chart of FIG. 4.

Purging of the clarification compartment 22 and of the filter bed located therein is accomplished by the timer 47 shown at the top of FIG. 1. In the normal, de-energized, positions of the valves 52 and 54 the compressed air source 42 delivers compressed air only to the tubes 33 and 44 to aerate and circulate the sludge while clarified water is drawn off via the drain 32 through the open valve 54. During the purge interval selected by the timer 47, however, the valves 52 and 54 are reversed, the valve 54 closing the effluent drain 32, while at the same time the valve 52 introduces compressed air into the stand pipe 30, through the horizontal pipe 48, and down through the filter bed 26 in the compartment 22. The pipe 48 has downwardly directed nozzle holes in it so as to direct jets of water and air directly onto the upper surface of the filter bed as shown in FIG. 1, thereby driving solid matter back out of the filter bed and through the slot 28 into the main circulation tank 15 as mentioned above. When the timer 47 finishes this purge interval, it first de-energizes the solenoid 53 to close the valve 52 and cease the flow of air into the clarification compartment, allowing the compartment to gradually refill with water through the slot 28 at a slow rate controlled by the size of the opening through the vent valve 31. Then the timer de-energizes the solenoid 55 to return the valve 54 to normal position to begin again the normal operating cycle of the apparatus as set forth in the first line of the chart shown in FIG. 4. As a result of the four steps shown in FIGS. 5, 6, 7, and 8 and designated in the chart of FIG. 4, mixed liquor laden with solids including ash and activated sludge is transferred from the main tank 15 over the weir into the auxiliary chamber during each purge, but only clarified liquid is transferred back again from the auxiliary chamber 11 into the main circulating tank, i.e., when the pump 38 is run, FIG. 7. Consequently, each purge cycle removes some of the solids from the main tank 15. By setting the height of the adjustable weir plate 19, the percentage of the solids actually removed from the main tank 15 by each purge cycle can be varied, whereby a setting can be reached which will achieve a satisfactory equilibrium of solids which are left in the main tank 15. The height of the pump 38 is adjusted by raising or lowering the chain 39 so as to adjust the level L', FIG. 7, to make room in the chamber 11 to receive the next overflow of mixed liquor from the tank 15, FIG. 8.

This invention is not to be limited to the exact embodiments shown in the drawings, for obviously changes may be made within the scope of the following claims.

I claim:

1. Apparatus for treating a mixed liquor of sewage water and solids by bacterial digestion to recover clarified effluent water, comprising:
   a. a main treatment tank having means to introduce sewage into the tank and having means to aerate and circulate the mixed liquor, and having a smaller internal clarification compartment communicating into the main tank at a location about which the liquor circulates;
   b. effluent pipe means coupled with the clarification compartment and operative to drain clarified effluent therefrom when the liquid level in the clarification compartment is at the drainage level of the pipe;
   c. an auxiliary compartment adjacent the main treatment tank and separated therefrom by a weir located higher than said drainage level and disposed so that a proportion of the mixed liquor circulting in the main tank will overflow the weir into the auxiliary compartment when the level of the liquid in the main tank is raised to said weir level;
   d. means for periodically backflushing the contents of the clarification compartment to displace the contents into the main tank and raise the liquid level in the tank above the level of the weir and cause overflow of the mixed liquor into the auxiliary compartment;
   e. second means operative between each periodic backflushing for aerating and circulating the contents of said auxiliary compartment, and further including means for disabling said second aerating means to permit settling of solids in the auxiliary chamber to leave a supernatant liquid therein; and
   f. means for transferring the supernatant liquid back into the main tank.

2. Apparatus as set forth in claim 1, further including an automatic timer having sequentially performed steps the sequence of which repeats at time-spaced intervals, and the timer including first step means coupled to said second aerating means and comprising said means for disabling it for a preset time interval to permit said settling of said solids in the auxiliary chamber; second step means coupled to said means for transferring supernatant liquid and operative near the end of said preset time interval to enable the transferring means for a period of time; and third step means operative at the end of said period of time to enable said back-flushing means long enough to back-flush the contents from the clarification compartment.

3. Apparatus as set forth in claim 2, wherein the total time of operation of said first, second and third step means is small as compared with the interval of time of nonperformance of this sequence of steps.

4. Apparatus as set forth in claim 1, wherein the height of the weir above said drainage level is adjustable to adjust the proportion of the mixed liquor which overflows it when the contents of the clarification compartment is back-flushed into the main tank.

5. Apparatus as set forth in claim 4, wherein said means for transferring supernatant liquid comprises pump means in the auxiliary compartment having an intake and having a discharge coupled into the main tank, and means for adjusting the height of said intake in the auxiliary compartment such that the pump means will transfer enough supernatant liquid to make room for the mixed liquor which overflows the weir during the next back-flushing step.

6. Apparatus as set forth in claim 1, said means for back-flushing the clarification compartment comprising a source of compressed air, a compressed air line extending into the clarification compartment, and control means connected with said source and said line and operative to inject air under pressure into said clarification compartment to displace the contents thereof from the compartment into the main tank.

7. Apparatus as set forth in claim 1, wherein said means for aerating and circulating the contents of said auxiliary compartment comprises a diffuser bubbling air upwardly from the bottom of the auxiliary compartment; and a draft tube fixed within said compartment in vertical orientation and extending upwardly from a location just above said diffuser and ending just beneath said means for transferring supernatant liquid.

8. Apparatus as set forth in claim 1, further including means in the bottom of said auxiliary tank for drawing off settled solids while the second aeration means is disabled.

9. Apparatus for treating sewage materials by bacterial digestion to recover clarified effluent water therefrom, comprising:
   a. a closed main treatment tank having a partition at the one end, the partition having an overflow weir therethrough at a first level near the top of the tank;
   b. means for delivering raw sewage into the tank;
   c. a clarification compartment comprising an outer wall which is approximately cylindrical about a horizontal axis, the compartment being small in volume as compared with the volume of the main tank and being disposed with its axis near the center of the tank, and the compartment having a longitudinal slot opening through its bottom communicating into the main tank;
   d. a digester compartment connected to the tank at the partition and located to receive overflow from the main tank via the weir when the level in the main tank exceeds said first level, and having means to draw off materials from the bottom of the digester compartment;
   e. an effluent pipe extending into the tank at a second level below the level of the weir, and connected with the top of the clarification compartment and including a drainage valve which is normally open to maintain the level of the water in the tank at said second level by draining effluent water collected from the top of the clarification compartment, and the drainage valve being selectively closeable;
   f. first aeration means in the main tank operative to aerate the sewage therein and to cause it to circulate about the clarification compartment;
   g. second aeration means in the digester compartment selectively controllable to inject air to aerate the sewage therein and to cause it to circulate to maintain solid materials in suspension, and to cease injecting air to permit solid materials to settle toward said draw-off means; and h. compressed air means operative to inject air into the top of the clarification compartment to purge it by backflushing its contents through said slot and displace the contents into the main tank, the volume of the clarification compartment being sufficient that when its contents are displaced into the tank part of the contents of the main tank overflow the weir into the digester compartment.

10. The apparatus as set forth in claim 9, wherein the clarification compartment supports a filter partly filling the compartment and ending at a level below the top of the compartment.

11. The apparatus as set forth in claim 9, including a supernatant pump in said digester compartment below the weir and operable to pump clear water back across the partition into the main tank when solids have settled below the pump level.

12. The apparatus as set forth in claim 11, further including timer means operative periodically to render said second aeration means inoperative and then after a settling interval to render said pump operative to pump clear water back into the main tank from said digester compartment, and the timer means being operative thereafter to close the drainage valve and to actuate said compressed air means to inject air into the top of the clarification compartment and back-flush its contents into the main tank and make its contents overflow the weir and transfer new sewage materials thereinto.

* * * * *